F. GRINNELL.
Automatic-Valve for Fire-Extinguishers.

No. 218,524. Patented Aug. 12, 1879.

WITNESSES
Joseph A. Miller Jr.
William L. Cook.

INVENTOR:
Frederick Grinnell
by Joseph A. Miller
Attorney

UNITED STATES PATENT OFFICE.

FREDERICK GRINNELL, OF PROVIDENCE, RHODE ISLAND.

IMPROVEMENT IN AUTOMATIC VALVES FOR FIRE-EXTINGUISHERS.

Specification forming part of Letters Patent No. 218,524, dated August 12, 1879; application filed April 21, 1879.

*To all whom it may concern:*

Be it known that I, FREDERICK GRINNELL, of the city and county of Providence, and State of Rhode Island, have invented certain new and useful Improvements in Automatic Valves; and I hereby declare that the following is a full, clear, and exact description of the same, reference being had to the accompanying drawings, forming part of this specification.

This invention has reference to valves used in connection with automatic fire-extinguishers, arranged to open when the water or air escapes through some imperfection in the system of pipes, or one or more of the fire-extinguishers are opened, either by the action of a fire or from any other source, so that the pressure in the system of pipes is diminished; and the invention consists in a valve rigidly secured to its seat and arranged to be released when the pressure in the system of pipes is diminished.

Figure 1:
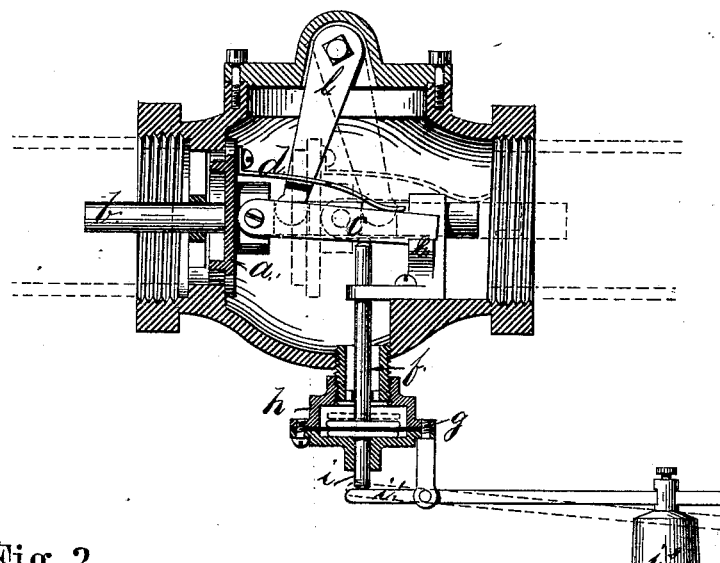
Figure 2:
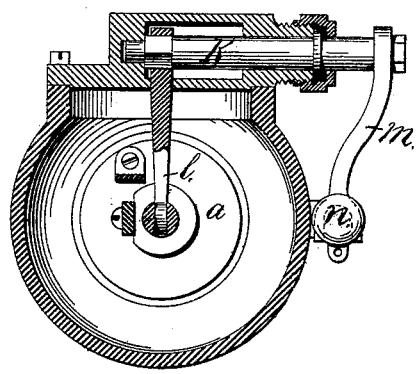
Figure 3:
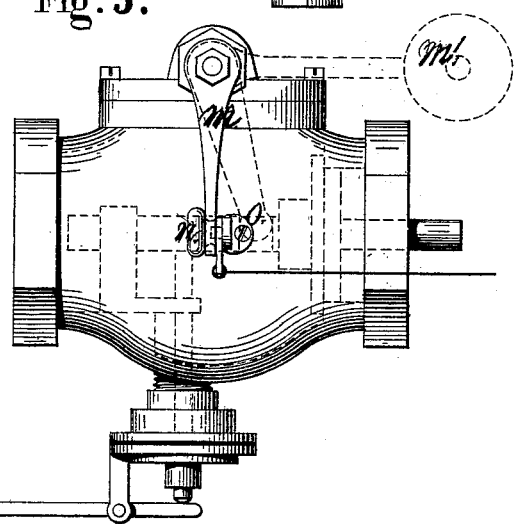

Figure 1 is a longitudinal vertical section of my improved valve, showing the valve and valve-stem, the latch by which it is secured, the releasing device with its balance-weight, and the arm connecting the valve with a lever on the outside of the valve-case, by which any kind of alarm may be set in motion. Fig. 2 is a cross-section of the valve, showing the connection with the valve of a rocking shaft extending to the outside of the valve inclosed with a stuffing-box, and communicating motion from the valve to the outside lever, by means of which an alarm is set in motion. Fig. 3 is a view of the outside of the valve, the interior parts being shown in broken lines, as also a balance-weight which may be secured to the rock-shaft, so as to throw the valve wide open as soon as the valve is released.

Similar letters of reference indicate corresponding parts.

When a building is protected by a system of automatic fire-extinguishers, such as are operated either directly by the heat generated by a fire or by any other automatic means, the water-pressure must be kept on the whole system of pipes, or the pipes must be filled with air under sufficient pressure to counteract the pressure of the water. If in such a complicated system a leak takes place, notice should be given of such leak; and if a fire takes place it is important that immediate notice should be given by the sounding of some suitable alarm. When, however, a valve is connected with the water-supply, and valves or taps are connected with the same supply-main, then the sudden closing of any one of these valves or taps causes, by the sudden arresting of a column of flowing water, a water-hammer, and this water-hammer will operate the valve sufficiently to give the alarm. Another difficulty consists in that the pressure maintained in the system of pipes must be equal to the water-pressure, and whether the system of pipes is filled with air or water, it becomes difficult to maintain the system perfectly tight.

To overcome all these difficulties is the object of this invention; and by the use of this valve, no matter how great the water-pressure, the pressure on the system of pipes may be only a low pressure, and still any diminution of this pressure, either by leak or the opening of any extinguisher, will operate the alarm and turn the whole force of the water on the system, and discharge the water by the distributer opened at or near the fire.

In the drawings, *a* represents a valve, which may be of any desired form and arranged to fit any kind of a valve-seat. The valve and seat may be arranged to be self-packing, so as to form a tight fit at any pressure; and it may in some cases be arranged to leak slightly under pressure. *b* is the valve-stem, which, sliding in suitable bearings, guides the valve and keeps it at all times concentric with the valve-seat. *c* is a hinged latch, provided near its free end with a catch or shoulder resting against the abutment *e*, and held down by the spring *d*, when the valve is held tight against its seat, thereby firmly and positively holding the valve against its seat, and preventing the valve from moving until the hinged latch *c* is raised and allowed to slide over the abutment *e*.

To raise the latch and allow the valve to open at the desired time automatically, a connection is made with the valve-case, in which is a rod, *f*, provided at its lower end with a disk, the upper end being guided so as to come in contact with the latch *c*. This rod *f*, with its disk, rests on the diaphragm *g*, secured water-tight within the case $h$, and under the diaphragm another disk and rod, $i$, is operated upon by the hinged lever $i^1$ and adjustable balance-weight $i^2$. A coiled spring may be made to surround the pin $i$, which may be made adjustable by means of a screw, so that the pressure on the pin $i$ can be adjusted the same as is shown by the adjustable balance-weight.

To illustrate the operation of this device it must be considered that this valve is connected with a water-main in which the pressure is, say, fifty pounds to each square inch, and that the outlet of the valve is connected with a system of pipes in which water or air is to be held under the same or a lower pressure. If we assume that it is desired to have a minimum pressure of ten pounds in the system of pipes, that everything is tight, and the valve is shut, held by the latch $c$, now, first, no matter what the pressure in the main may be at times, whether it suddenly increases or decreases, the valve cannot be disturbed, and the variations of pressure cannot affect the pressure in the system of pipes, in which, having fixed the minimum at ten pounds, with the pressure in the valve-case and acting on the diaphragm, the pins $f$ and $i$, the diaphragm $g$, the lever $i^1$, and balance-weight all will be in the position shown in Fig. 1 in solid lines, and they will maintain that position no matter how much from any source the pressure may be raised; but as soon as the pressure within the system of pipes falls to ten pounds, the balance-weight $i^2$, or the coiled spring referred to, will overcome the internal pressure, raise the rod $f$ against the latch $c$, disengage the same, release the valve, and allow the same to move rapidly from its seat, opening wide the supply to the system of pipes.

It is obvious that any pressure less than the pressure in the mains may be selected as the pressure at which the valve is to be released, by adjusting the pressure on the pin $i$, so as to overcome the internal pressure when the desired minimum in pressure is reached.

Connections may be made with the lever $i^1$ to operate the alarm; but the arrangement preferred by me consists in connecting the rocking spindle $k$, by means of the arm $l$, with the valve-stem, extending the spindle to the outside of the valve-case through a stuffing-box, and connecting with the spindle the arm $m$, and to the arm $m$ any desired mechanism to operate or start any kind of an alarm.

In Figs. 2 and 3 a button, $n$, is shown, to which a wire is secured, which connects with the alarm, so that when the valve is opened a latch may be released and the alarm sounded. The arm $m$ is also used to reset the valve after a fire or after an alarm has been sounded.

When it is desirable to have but little difference in the pressure between the supply-main and the system of pipes, the valve would not be liable to open quickly, and to insure the wide and rapid opening of the valve under such circumstances, I place on the spindle $k$, outside the case, an auxiliary arm provided with a weight, $m'$, as shown in broken lines in Fig. 3, so that when the valve is released the weight $m'$ will assist in the opening of the valve, and insure its opening sufficiently to secure a full supply of water.

When in a system of automatic fire-extinguishers the water-supply in the main is liable to be so diminished that on the breaking out of a fire the supply would be insufficient, then to give notice of such diminution of the pressure I secure to the mains, at any desired point, the case $h$, provided with the diaphragm $g$, the pin and disk $i$, lever $i^1$, and weight $i^2$, and connect the lever with any suitable alarm, so that when the pressure on the diaphragm $g$ is diminished below the fixed minimum, the alarm will be sounded and timely notice given of the diminution of the pressure in the main.

The button $n$ is held against the bracket $o$ by the arm $m$, when the valve is secured to its seat, and as the button is provided with a hole and a bracket with a pin on which the button rests, the button will sustain a great strain or a heavy weight, and a slight motion of the valve, sufficient to move the arm $m$, so that the button is freed from the pin, will release the same and start the alarm. By this arrangement the breaking of the connecting-wire from any cause will start the alarm and so give notice that the system requires attention.

It is obvious that, instead of the button $n$, other devices may be used that will be released by a slight motion of the arm $m$.

Having thus described my invention, I claim as new and desire to secure by Letters Patent—

1. The combination, with a valve and locking mechanism for locking the valve in a closed position, of a diaphragm and intervening devices connecting with said locking mechanism, whereby the pressure in the valve-casing, being less than the force exerted on the locking mechanism, operates to open the valve, substantially as set forth.

2. The combination, with a valve provided with a latch by which it is held to its seat, of an automatic detaching device arranged to detach the latch and release the valve when the pressure within the valve-body is less than the force acting on the detaching device, substantially as and for the purpose set forth.

3. The combination, with a system of pipes for distributing water, of the case $h$, communicating with the interior of the pipes, and provided with the diaphragm $g$, the pin or rod $i$, the lever $i^1$, and weight $i^2$, substantially as and for the purpose set forth.

4. The combination, with a valve provided with a latch arranged to hold it firmly to its seat, of the rods $f$ and $i$, the diaphragm $g$, and an adjustable device by means of which pressure is exerted against the diaphragm, and the rod $f$ is made to detach the latch and release the valve automatically when the internal pressure ceases to counterbalance the external pressure.

5. The combination, with the button $n$ or similar device arranged to be connected with an alarm, of the arm $m$, connected with and operated by an automatic valve, so that at the opening of the valve the button or similar device is released, substantially as and for the purpose set forth.

6. The combination, with a valve-case provided with a valve held to its seat by a latch and connected by means of an arm and rocking spindle with an alarm, of an automatic detaching device arranged to release the valve when the minimum pressure is reached, by means substantially as and for the purpose set forth.

FREDERICK GRINNELL.

Witnesses:
JOSEPH A. MILLER,
JOSEPH A. MILLER, Jr.